United States Patent
Lee et al.

(10) Patent No.: US 11,840,235 B1
(45) Date of Patent: Dec. 12, 2023

(54) ELECTRIC VEHICLE AND CONTROL METHOD THEREOF

(71) Applicants: Hyundai Motor Company, Seoul (KR); Kia Corporation, Seoul (KR); Hyundai WIA Corporation, Changwon-si (KR)

(72) Inventors: Taewoo Lee, Suwon-si (KR); Jeong Won Song, Hwaseong-si (KR); Sung Keun Lim, Hwaseong-si (KR); Junseok Park, Seoul (KR); Jong Chan Lee, Hanan-si (KR); Heon Kang, Hwaseong-si (KR)

(73) Assignees: Hyundai Motor Company, Seoul (KR); Kia Corporation, Seoul (KR); Hyundai WIA Corporation, Changwon-si (KR)

( * ) Notice: Subject to any disclaimer, the term of this patent is extended or adjusted under 35 U.S.C. 154(b) by 0 days.

(21) Appl. No.: 18/201,058

(22) Filed: May 23, 2023

(30) Foreign Application Priority Data

Aug. 29, 2022 (KR) .......................... 10-2022-0108479

(51) Int. Cl.
*B60W 30/18* (2012.01)
*B60W 30/188* (2012.01)
(Continued)

(52) U.S. Cl.
CPC ........ *B60W 30/188* (2013.01); *B60W 30/182* (2013.01); *B60W 30/18145* (2013.01);
(Continued)

(58) Field of Classification Search
CPC ......... B60W 30/188; B60W 30/18145; B60W 30/182; B60W 2520/14; B60W 2520/26;
(Continued)

(56) References Cited

U.S. PATENT DOCUMENTS

| | | | |
|---|---|---|---|
| 9,868,349 B2 * | 1/2018 | Pritchard | ................ F16D 25/12 |
| 11,279,230 B2 * | 3/2022 | O'Rourke | .............. B60K 23/04 |

(Continued)

FOREIGN PATENT DOCUMENTS

| | | | | |
|---|---|---|---|---|
| DE | 102009045852 A1 * | 4/2011 | ......... | B60K 23/0808 |
| KR | 10-2014-0117144 A | 10/2014 | | |
| KR | 10-2021-0089817 A | 7/2021 | | |

*Primary Examiner* — Justin Holmes
(74) *Attorney, Agent, or Firm* — MORGAN, LEWIS & BOCKIUS LLP (57) ABSTRACT

An electric vehicle includes a drive motor configured for generating power required for driving of the vehicle, a twin clutch which may include a first clutch and a second clutch and configured to adjust distribution of the power supplied from the drive motor to a first drive wheel and a second drive wheel of the vehicle through the first clutch corresponding to the first drive wheel and the second clutch corresponding to the second drive wheel, and a controller electrically connected to the twin clutch and configured to, when a control condition for a deceleration turning of the vehicle is satisfied, determine a control torque of the twin clutch as a larger value of an initial torque to prevent slip of the twin clutch and a base torque determined based on output torque of the drive motor, and distribute the control torque to the first clutch and the second clutch depending on a drive mode of the vehicle.

19 Claims, 10 Drawing Sheets

(51) Int. Cl.
 *F16D 48/06* (2006.01)
 *B60W 30/182* (2020.01)
(52) U.S. Cl.
 CPC ......... *F16D 48/06* (2013.01); *B60W 2520/14* (2013.01); *B60W 2520/26* (2013.01); *B60W 2540/10* (2013.01); *B60W 2540/18* (2013.01); *F16D 2500/30412* (2013.01); *F16D 2500/30421* (2013.01); *F16D 2500/3108* (2013.01); *F16D 2500/5075* (2013.01)
(58) Field of Classification Search
 CPC ........... B60W 2540/10; B60W 2540/18; F16D 48/06; F16D 2500/30412; F16D 2500/30421; F16D 2500/3108; F16D 2500/5075
 See application file for complete search history.

(56) References Cited

U.S. PATENT DOCUMENTS

| | | | | |
|---|---|---|---|---|
| 2003/0037977 | A1* | 2/2003 | Tatara | B60W 10/02 903/917 |
| 2015/0111696 | A1* | 4/2015 | Maeda | B60W 10/119 477/79 |
| 2018/0154882 | A1* | 6/2018 | Sasaki | B60K 6/52 |
| 2021/0323402 | A1* | 10/2021 | Stock | B60K 17/02 |

\* cited by examiner

ELECTRIC VEHICLE AND CONTROL METHOD THEREOF

CROSS-REFERENCE TO RELATED APPLICATION

The present application claims priority to Korean Patent Application No. 10-2022-0108479 filed on Aug. 29, 2022, the entire contents of which is incorporated herein for all purposes by this reference.

BACKGROUND OF THE PRESENT DISCLOSURE

Field of the Present Disclosure

The present disclosure relates to an electric vehicle and a control method thereof. More particularly, the present disclosure relates to an electric vehicle and a control method thereof capable of stabilizing the vehicle behavior and secure the vehicle driving performance by use of a twin clutch during deceleration turning of the vehicle situation.

Description of Related art

In general, a rear wheel drive (RWD) vehicle is a vehicle that shifts power generated by a power source through a transmission and transmits it to a rear axle through a propeller shaft. Because the power is supplied to the rear wheels, handling performance may be improved, enabling the drifting of the vehicle. Furthermore, as the acceleration is harder, more weight is transferred to the rear wheels, which increase the traction of the drive (rear) wheels Furthermore, a four wheel drive (4 WD) or all-wheel drive (AWD) vehicle distributes the power generated by the power source to the four wheels to increase the overall torque of the vehicle, and thereby provides an advantage of better driving performance on uneven roads, snowed or iced roads, muddy roads, and the like.

Accordingly, the RWD vehicle, the 4 WD vehicle, and the AWD vehicle may be provided with a hydraulic clutch apparatus to distribute the drive torque from the power source to both rear wheels or all of the four wheels, and the hydraulic clutch apparatus may be provided on a rear wheel axle or on a drive line between a front wheel axle and a rear wheel axle.

Recently, to improve handling and traction performance of the RWD, 4 WD, and AWD vehicles, there is an attempt to employ a twin clutch capable of independently controlling torque distribution to the two rear wheels by employing left and right side clutches that are independently operable.

It may be understood that torques applied to the left and right side clutches may be appropriately controlled to improve vehicle dynamics of the vehicle applied with such a twin clutch. That is, by appropriately distributing the torque of the power source to the left and right drive wheel by the twin clutch, the vehicle behavior may be more stabilized or may become more dynamic, as target by a driver or in diving circumstances.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electric vehicle and a control method thereof configured for stabilizing the vehicle behavior as well as improving driving performance of the vehicle by appropriately distributing the drive torque to a turning-inner wheel and a turning-external wheel in a deceleration turning situation of the vehicle.

An electric vehicle includes a drive motor configured for generating power required for driving of the vehicle, a twin clutch which may include a first clutch and a second clutch and configured to adjust distribution of the power supplied from the drive motor to a first drive wheel and a second drive wheel of the vehicle through the first clutch corresponding to the first drive wheel and the second clutch corresponding to the second drive wheel, and a controller electrically connected to the twin clutch and configured to, when a control condition for a deceleration turning of the vehicle is satisfied, determine a control torque of the twin clutch as a larger value of an initial torque to prevent slip of the twin clutch and a base torque determined based on output torque of the drive motor, and distribute the control torque to the first clutch and the second clutch depending on a drive mode of the vehicle.

The control condition may include a vehicle speed being greater than or equal to a preset speed, a steering angle of a steering wheel being greater than or equal to a first preset angle, and an accelerator pedal opening being maintained to 0 for more than a preset time period.

The control condition may be released when any one element condition of the control condition is not satisfied.

when the steering angle of the steering wheel is above a second preset angle in the deceleration turning of the vehicle, the controller may be configured for determining a yaw damping torque, and determine the control torque as a value obtained by adding the yaw damping torque to the larger value of the initial torque and the base torque.

when the first drive wheel or the second drive wheel slips in the deceleration turning of the vehicle, the controller may be configured for determining a slip control torque, and determine the control torque as a value obtained by adding the slip control torque to the larger value of the initial torque and the base torque.

The drive mode may include a comfort mode, a sports mode, and a drift mode.

The controller may increase a clutch torque applied to a clutch of the first clutch and the second clutch for a turning-external drive wheel among the first drive wheel and the second drive wheel and decrease a clutch torque applied to a clutch for a turning-inner drive wheel as the drive mode is varied from the comfort mode to the sports mode, and from the sports mode to the drift mode.

A control method of an electric vehicle, the control method includes determining, by a vehicle controller, whether a control condition for a deceleration turning of the vehicle is satisfied, determining, the vehicle controller, a control torque of a twin clutch as a larger value of an initial torque to prevent slip of the twin clutch and a base torque determined based on an output torque of a drive motor, when the control condition is satisfied, and distributing the control torque to a first clutch and a second clutch of the twin clutch depending on a drive mode of the vehicle.

The control condition may include a vehicle speed being greater than or equal to a preset speed, a steering angle of a steering wheel being greater than or equal to a first preset angle, and an accelerator pedal opening being maintained to 0 for more than a preset time period.

The control condition may be released when any one element condition of the control condition is not satisfied.

A control method may further include, when the steering angle of the steering wheel is above a second preset angle in the deceleration turning of the vehicle, determining a yaw damping torque, and determining the control torque by adding the yaw damping torque to a larger value of the initial torque and the base torque.

A control method may further include, when the first drive wheel or the second drive wheel slips in the deceleration turning of the vehicle, determining a slip control torque, and determining the control torque by adding the slip control torque to a larger value of the initial torque and the base torque.

The drive mode may include a comfort mode, a sports mode, and a drift mode.

a clutch torque applied to a clutch for a turning-inner drive wheel may be decreased and a clutch torque applied to a clutch of the first clutch and the second clutch for a turning-external drive wheel among the first drive wheel and the second drive wheel may be increased as the drive mode is varied from the comfort mode to the sports mode, and from the sports mode to the drift mode.

According to an electric vehicle and a control method thereof according to an exemplary embodiment of the present disclosure, the vehicle behavior may be stabilized and the driving performance of the vehicle may be enhanced by distributing clutch torques applied left and right clutches of a twin clutch in a deceleration and turning situation of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To clearly describe the present disclosure, portions that are irrelevant to the description are omitted, and identical or similar constituent elements throughout the specification are denoted by the same reference numerals.

Furthermore, because the size and thickness of each configuration shown in the drawings are arbitrarily shown for convenience of description, the present disclosure is not necessarily limited to configurations illustrated in the drawings, and to clearly illustrate several parts and areas, enlarged thicknesses are shown.

The terms "module" and "unit" for components used in the following description are used only to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components.

As used herein, the singular forms "a", "an" and "the" are intended to include the plural forms as well, unless the context clearly indicates otherwise.

The terms are only used to differentiate one component from others.

It is to be understood that when one component is referred to as being "connected" or "coupled" to another component, it may be directly connected or coupled to another component or be connected or coupled to another component with the other component intervening therebetween.

On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Hereinafter, an electric vehicle according to an exemplary embodiment of the present disclosure is described in detail with reference to the drawings.

Figure 1:
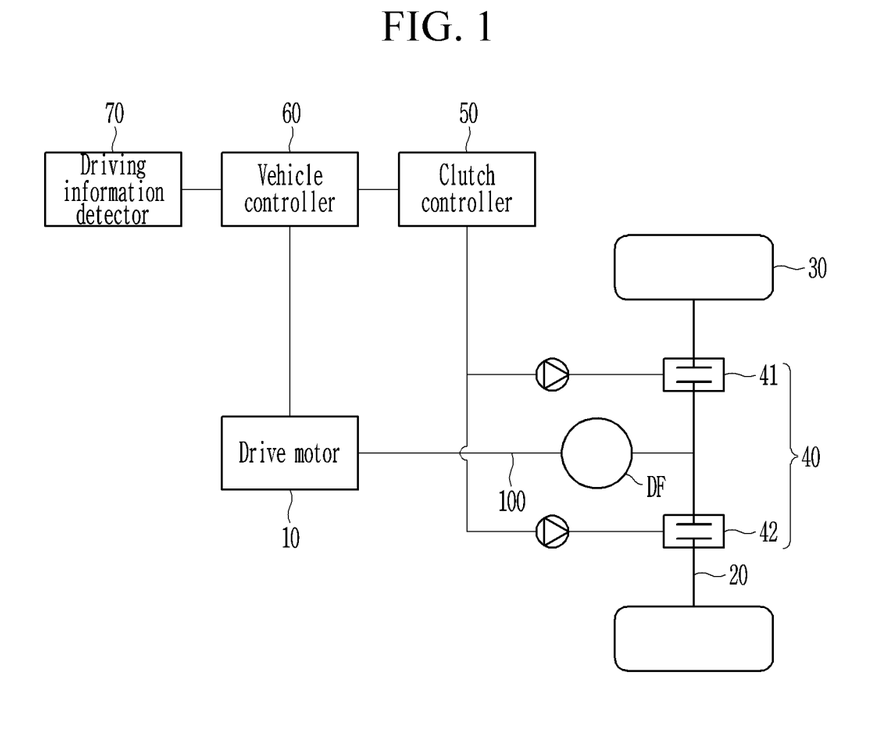
FIG. 1 is a schematic diagram showing an electric vehicle according to an exemplary embodiment of the present disclosure.

FIG. 1 is a schematic diagram showing an electric vehicle according to an exemplary embodiment of the present disclosure. Furthermore, FIG. 2 is a block diagram showing an electric vehicle according to an exemplary embodiment of the present disclosure.

Figure 2:
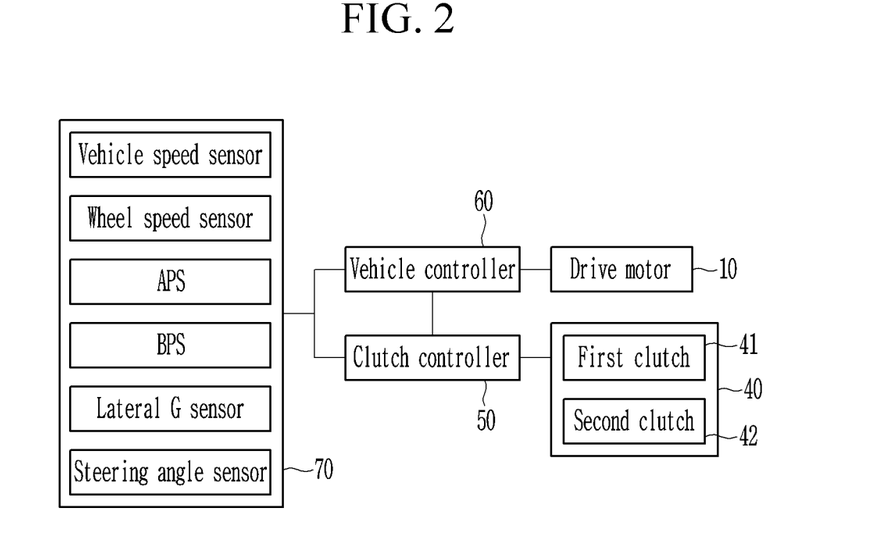
FIG. 2 is a block diagram showing an electric vehicle according to an exemplary embodiment of the present disclosure.

As shown in FIG. 1 and in FIG. 2, a control apparatus of an electric vehicle according to various exemplary embodiments of the present disclosure may include a drive motor 10, a vehicle controller 60, a twin clutch 40, a clutch controller 50.

The drive motor 10 generates a driving force required for driving of the vehicle by use of electrical energy, and the vehicle moves as the driving force generated by the drive motor 10 is supplied to the drive wheels (e.g., rear wheels) 30 or all wheels of the vehicle. The drive motor 10 may be configured to generate electrical energy by operating as a generator as needed (e.g., in a regenerative braking mode).

The twin clutch 40 is provided on the axle 20 mounted on which the drive wheels 30 are mounted, and includes a first clutch 41 and a second clutch 42 provided on both sides of the axle 20 with respect to a propeller shaft 100. According to engagement and disengagement of the twin clutch 40, the driving torque supplied from the drive motor 10 to the drive wheel 30 is supplied to or cut off from the drive wheels (e.g., rear wheels) 30, and the driving torques supplied to the drive wheels are adjusted as needed.

The first clutch 41 and the second clutch 42 of the twin clutch 40 respectively includes a pack of clutch plates and clutch disks, and engaged or disengaged according to a hydraulic pressure generated by and supplied from a hydraulic pressure pump. That is, the clutches 41 and 42 are engaged when the clutch plates and clutch disks are frictionally coupled to each other by the hydraulic pressure supplied from the hydraulic pressure pump. To the contrary, the clutch is disengaged or released due to disengagement of the clutch plates and the clutch disks when the hydraulic pressure is not generated by or supplied from the hydraulic pressure pump.

In an exemplary embodiment of the present disclosure, a torque (hereinafter, called a clutch torque) applied to respective clutch may be controlled by independently adjusting levels of the hydraulic pressures applied to the first clutch and the second clutch 41 and 42. By independently controlling the clutch torques of the first clutch and the second clutch 41 and 42, the levels of driving torques distributed to the drive wheels 30 through the first clutch 41 and the second clutch 42 may be adjusted. The level of the hydraulic pressure generated by the hydraulic pressure pump and applied to respective clutches may be a torque applied to respective clutch. The torque applied to the clutch according to the magnitude of the hydraulic pressure may be determined by an experiment and stored in the clutch controller 50 in advance.

The vehicle controller 60 may control various components required for running of the vehicle including the drive motor 10, and may perform a cooperative control with the clutch controller 50 as needed.

Depending on implementations, the clutch controller 50 and the vehicle controller 60 may be integrated or distributed (or to be separate). In an exemplary embodiment of the present disclosure, an example in which the clutch controller 50 and the vehicle controller 60 are implemented integrally will be described. In an exemplary embodiment of the present disclosure, the clutch controller 50 and the vehicle controller 60 may be collectively referred to a controller.

Each of the clutch controller 50 and the vehicle controller 60 may be provided as at least one processor operable by a predetermined program, and the predetermined program may be programmed to perform each steps in a control method of an electric vehicle including the twin clutch 40 according to an exemplary embodiment of the present disclosure.

Meanwhile, a control apparatus of an electric vehicle according to an exemplary embodiment of the present disclosure includes a driving information detector 70 configured to detect driving information required for driving the vehicle, and the driving information detected by the driving information detector 70 is transmitted to the clutch controller 50 and the vehicle controller 60.

The driving information may include a vehicle speed, a wheel speed, an accelerator pedal opening, a brake pedal opening, turning state of the vehicle, drive mode of the vehicle, and a steering angle of a steering wheel.

For such a purpose, the driving information detector 70 may include a vehicle speed sensor configured for detecting the vehicle speed, a wheel speed sensor configured for detecting the wheel speed, an accelerator pedal sensor (APS) for detecting the accelerator pedal opening, a brake pedal sensor (BPS) for detecting the brake pedal opening, a lateral acceleration sensor configured for detecting the turning state of the vehicle (or, a yaw rate sensor configured for detecting a yaw rate of the vehicle), and a steering angle sensor configured for detecting a steering angle of the steering wheel.

The accelerator pedal opening detected by the accelerator pedal sensor may be in a range of 0% (when not pressed by the driver) to 100% (when fully depressed by the driver), and the brake pedal opening detected by the brake pedal sensor may be in a range of 0% (when not pressed by the driver) to 100% (when fully depressed by the driver).

The drive mode of the vehicle may include a comfort mode, a sports mode, and a drift mode. The comfort mode is for providing comfort to the occupants by maximizing the ride comfort by reducing noise, vibration, and harshness (NVH) of the vehicle, the sports mode is for improving acceleration performance and response of the vehicle, and the drift mode is for easily and stably achieving drifting of the vehicle. The drive mode of the vehicle may be determined by a driver manipulating a mode selection button.

Hereinafter, a control method of the electric vehicle according to an exemplary embodiment as described above will be described in detail with reference to the accompanying drawings.

Figure 3:
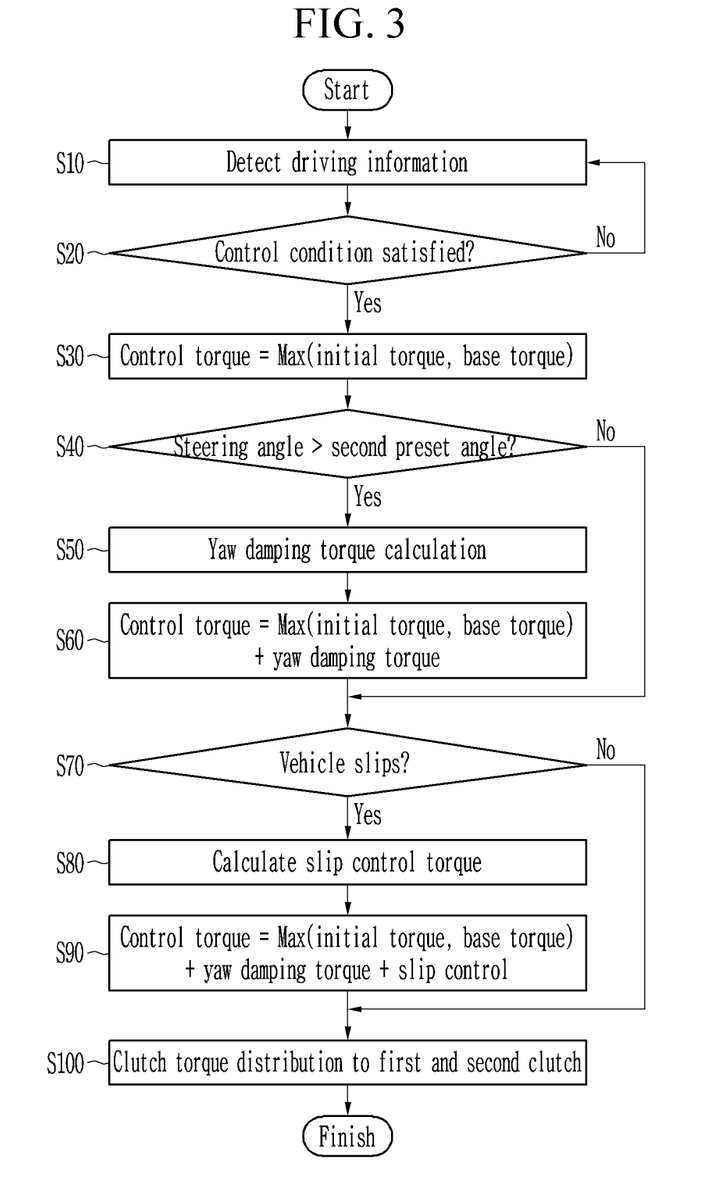
FIG. 3 is a flowchart showing a control method of an electric vehicle according to an exemplary embodiment of the present disclosure.
Figure 4A:
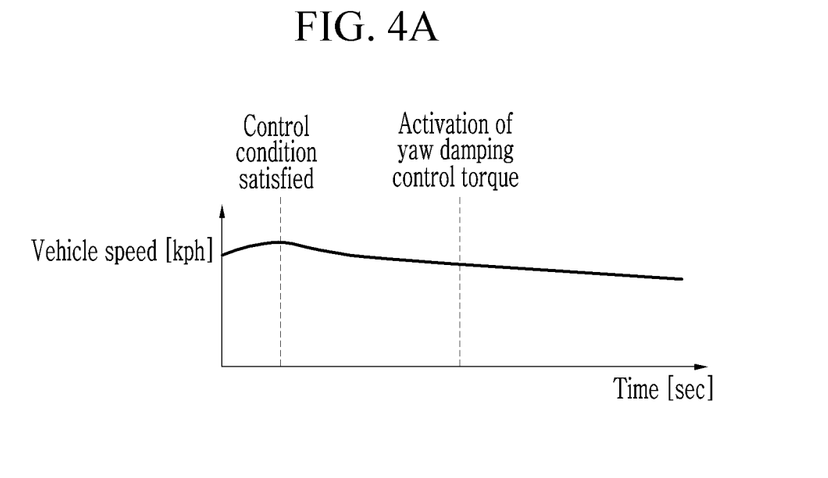
FIG. 4A, FIG. 4B, FIG. 4C, FIG. 4D, FIG. 4E and FIG. 4F are diagram charts illustrating an operation of an electric vehicle according to an exemplary embodiment of the present disclosure.
Figure 4B:
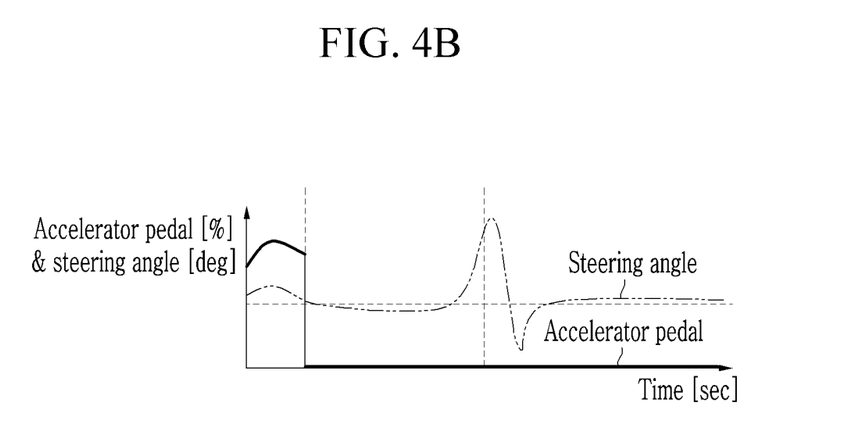
Figure 4C:
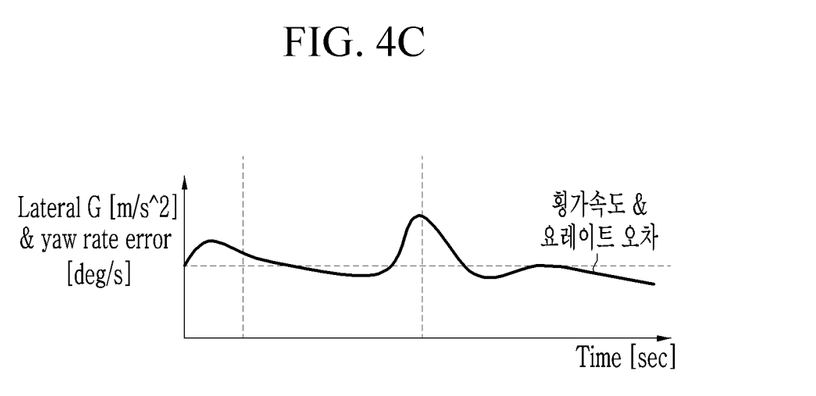
Figure 4D:
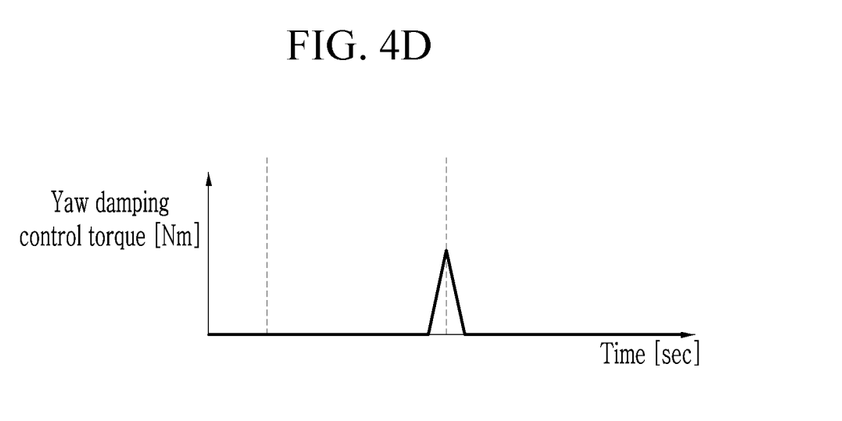
Figure 4E:
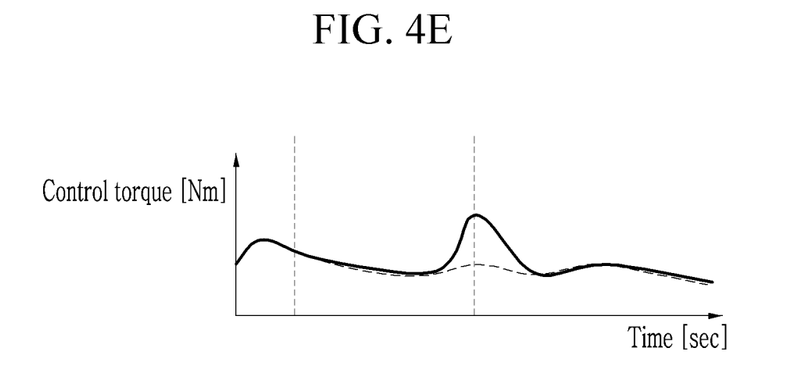
Figure 4F:
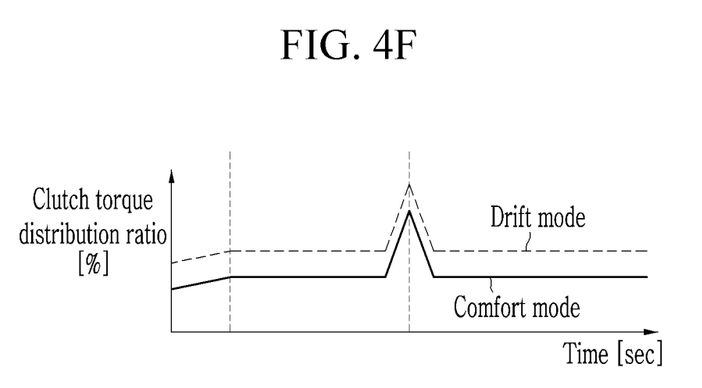
Figure 5:
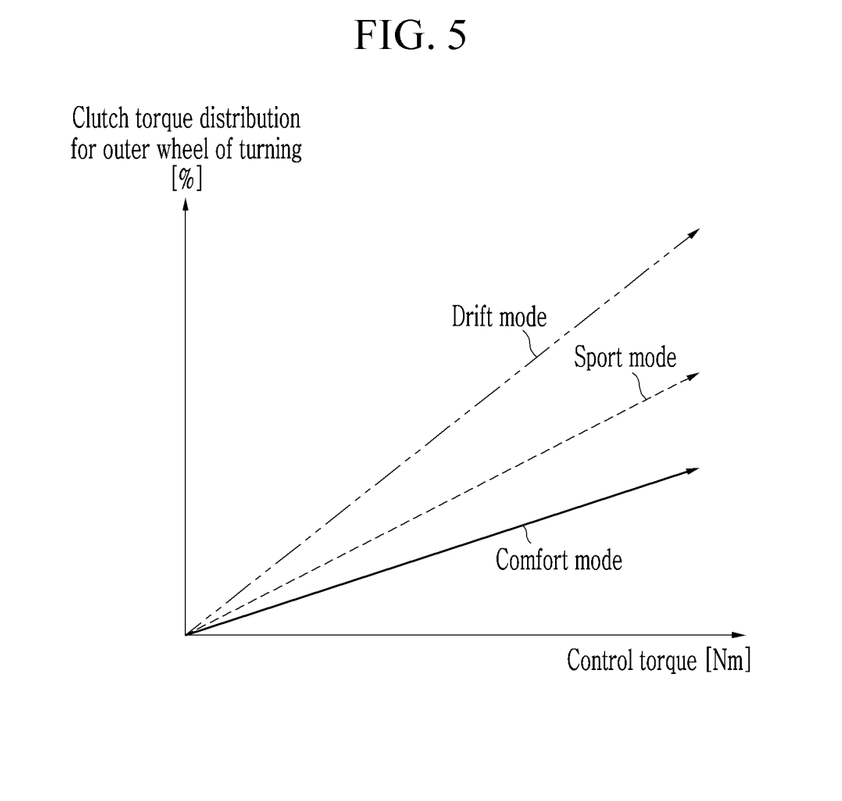
FIG. 5 is a graph showing a clutch torque applied to a first clutch and a second clutch according to an exemplary embodiment of the present disclosure.

FIG. 3 is a flowchart showing a control method of an electric vehicle according to an exemplary embodiment of the present disclosure. FIG. 4 is a diagram chart illustrating an operation of an electric vehicle according to an exemplary embodiment of the present disclosure. FIG. 5 is a graph showing a clutch torque applied to a first clutch and a second clutch according to an exemplary embodiment of the present disclosure.

Referring to FIG. 3, at step S10, the driving information detector 70 detects the driving information required for driving the vehicle, and the detected driving information is transmitted to the vehicle controller 60 and the clutch controller 50. Here, the driving information detected by the driving information detector 70 is the same as described above, and is omitted.

At step S20, the vehicle controller 60 is configured to determine whether a control condition for a deceleration turning of the vehicle is satisfied.

Here, the control condition for the deceleration turning of the vehicle includes, the vehicle speed being greater than or equal to a preset speed (e.g., 30 kps), the steering angle of the steering wheel being greater than or equal to a first preset angle (e.g., 30 degree), and an accelerator pedal signal detected by the accelerator pedal sensor being maintained to be OFF (or, the accelerator pedal opening is 0%) for more than a preset period (e.g., 2 seconds) (Refer to FIG. 5A and FIG. 5B). The control condition for the deceleration turning is released when any one element condition of the control condition is not satisfied.

At step S30, when the control condition is satisfied, the vehicle controller 60 compares an initial torque to prevent slip of the twin clutch 40, and a base torque determined based on output torque of the drive motor 10, and determine a control torque as a larger value of the initial torque and the base torque.

This is to consider the base torque and a minimum torque (e.g., a slip torque) required for driving of the vehicle and a required torque (e.g., base torque) depending on driving situations of the vehicle. In normal driving situations, the required torque (e.g., base torque) depending on driving situations of the vehicle is greater than the minimum torque which may be preset in the vehicle controller 60.

The control torque means a total clutch torque for the first clutch 41 and the second clutch 42 (or, a clutch for the turning-external wheel and a clutch for the turning-inner wheel). The control torque may be, for example, a larger value of the initial torque and the base torque, a value obtained by adding a yaw damping torque to the larger value, or a value obtained by further adding a slip control torque, which will be described later.

Here, the initial torque means a minimum clutch torque that does not induce slipping of the twin clutch in the deceleration turning of the vehicle. The initial torque may be defined as above, considering that a differential gear (DF) may be removed from the vehicle of an exemplary embodiment of the present disclosure, and in the instant case, to transfer the output of the drive motor 10 to the axial shafts, a clutch torque without causing slipping of the clutches 41 and 42 should be applied. Accordingly, except for special cases such as disconnection control, a certain level of clutch torque is required to drive the vehicle (to prevent the clutches 41 and 42 from slipping).

Furthermore, the initial torque may be dependent on regenerative braking level (or, regenerative braking amount). For example, the initial torque may increase as the regenerative braking level (or regenerative braking amount) increases.

The base torque means a clutch torque determined according to the output torque of the drive motor 10 during the deceleration of the vehicle (e.g., a clutch torque determined depending on driving situations of the vehicle), and may be varied depending on the vehicle and the drive mode, for differentiation of driving performance. For example, the base torque decreases as the vehicle speed decreases, the base torque in the sports mode is greater than the base torque in the comfort mode, and the base torque in the drift mode is greater than the base torque in the sports mode. That is, the base torque increases as the drive mode is changed from the comfort mode to the sports mode, and then to the drift mode.

At step S40, while the control condition is satisfied, the vehicle controller 60 is configured to determine whether the steering angle of the steering wheel is greater than or equal to a second preset angle (e.g., 60 degrees) (refer to FIG. 5C). At step S50, when the steering angle of the steering wheel is above the second preset angle, the vehicle controller 60 determine a yaw damping torque for stabilization of the vehicle behavior (refer to FIG. 5D).

The yaw damping torque is a clutch torque to stabilize the vehicle behavior when an excessive yaw directional movement of the vehicle occurs by a sudden operation of the steering wheel by the driver in the situation of the vehicle is in deceleration and turning.

In an exemplary embodiment of the present disclosure, the yaw damping torque may be determined based on the steering angle of the steering wheel and a change rate of the steering wheel, and may increase as the steering angle of the steering wheel and the change rate of the steering wheel increases.

At the present time, at step S60, the vehicle controller 60 is configured to determine the control torque by adding the yaw damping torque to the larger value of the initial torque and the base torque (refer to FIG. 5E).

At step S70, while the control condition is satisfied, the vehicle controller 60 is configured to determine whether the vehicle slips. When the vehicle slips, at step S80, the vehicle controller is configured for determining the slip control torque for stabilization of the vehicle behavior.

The slip control torque is a clutch torque to stabilize the vehicle behavior when the vehicle slips in the situation of deceleration and turning of the vehicle.

The slip control torque may be determined based on a slip ratio of the vehicle. The slip ratio of the vehicle may be determined by a difference between the vehicle speed and the wheel speed, and may be obtained according to Equation 1 below.

[Equation 1]

$$\text{slip ratio} = (\text{vehicle speed} - \text{wheel speed}) / \text{vehicle speed} * 100\%$$

In an exemplary embodiment of the present disclosure, the slip control torque may increase as the slip ratio of the drive wheel increases.

At the present time, at step S90, the vehicle controller 60 is configured to determine the control torque by adding the slip control torque to the larger value of the initial torque and the base torque.

When the control torque is determined, at step S100, the clutch controller 50 is configured to determine the clutch torques of the first clutch 41 and the second clutch 42 (i.e., the clutch torque for the turning-external wheel and the clutch torque for the turning-inner wheel) depending on the drive mode, and applies the clutch torques to the first clutch 41 and the second clutch 42 respectively (refer to FIG. 5F).

At the present time, the clutch controller 60 may distribute the control torque to the left and right drive wheels by the clutch torques applied to the first clutch 41 and second clutch 42 (the clutch for the turning-inner wheel and the clutch for the turning-external wheel) based on the drive mode of the vehicle.

For example, as shown in FIG. 5, a clutch torque distribution rate applied to the clutch for the turning-external wheel is smallest when the drive mode of vehicle is the comfort mode, and is largest when the drive mode of vehicle is the drift mode. Furthermore, when the drive mode of vehicle is the sports mode, the clutch torque distribution rate applied to the clutch for the turning-external wheel is determined as a value between the comfort mode and the drift mode.

Here, the clutch torque distribution rate means a ratio of the clutch torque applied to the clutch for the turning-inner wheel in comparison with the clutch torque applied to the clutch for the turning-external wheel, and a sum of the torque ratio applied to the clutch for the turning-external wheel and the torque ratio applied to the clutch for the turning-inner wheel is 100%.

According to an electric vehicle and a control method thereof according to an exemplary embodiment of the present disclosure, in the deceleration and turning situation of the vehicle, the vehicle behavior may be stabilized and dynamic driving performance may be ensured depending on the drive mode.

Furthermore, the yaw damping torque may be applied to the clutches of the twin clutch in response to a yaw directional movement generated by the driver's abrupt operation of the steering wheel, a yaw directional responsiveness of the vehicle may be adjusted.

Furthermore, when the vehicle slips during the deceleration and turning situation, the slip control torque may be applied to the clutches of the twin clutch to stabilize the vehicle behavior.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electric vehicle, comprising:
 a drive motor configured for generating power required for driving of the vehicle;
 a twin clutch that includes a first clutch and a second clutch and configured to adjust distribution of the power supplied from the drive motor to a first drive wheel and a second drive wheel of the vehicle through the first clutch corresponding to the first drive wheel and the second clutch corresponding to the second drive wheel; and a controller electrically connected to the twin clutch and configured to, when a control condition for a deceleration turning of the vehicle is satisfied, determine a control torque of the twin clutch as a larger value of an initial torque to prevent slip of the twin clutch and a base torque determined based on output torque of the drive motor, and distribute the control torque to the first clutch and the second clutch depending on a drive mode of the vehicle in a clutch torque distribution rate.

2. The electric vehicle of claim 1, wherein the control condition includes element conditions of a vehicle speed being greater than or equal to a preset speed, a steering angle of a steering wheel being greater than or equal to a first preset angle, and an accelerator pedal opening being maintained to 0 for more than a preset time period.

3. The electric vehicle of claim 2, wherein the control condition is released when one element condition in the element conditions of the control condition is not satisfied.

4. The electric vehicle of claim 2,
wherein, when the steering angle of the steering wheel is above a second preset angle in the deceleration turning of the vehicle, the controller is configured for determining a yaw damping torque, and for determining the control torque as a value obtained by adding the yaw damping torque to the larger value of the initial torque and the base torque.

5. The electric vehicle of claim 2,
wherein, when the first drive wheel or the second drive wheel slips in the deceleration turning of the vehicle, the controller is configured for determining a slip control torque, and for determining the control torque as a value obtained by adding the slip control torque to the larger value of the initial torque and the base torque.

6. The electric vehicle of claim 1, wherein the drive mode includes a comfort mode, a sports mode, and a drift mode.

7. The electric vehicle of claim 6, wherein the controller is configured to increase a clutch torque applied to a clutch of the first clutch and the second clutch for a turning-external drive wheel among the first drive wheel and the second drive wheel and to decrease a clutch torque applied to a clutch for a turning-inner drive wheel among the first drive wheel and the second drive wheel as the drive mode is varied from the comfort mode to the sports mode, and from the sports mode to the drift mode.

8. The electric vehicle of claim 7, wherein the clutch torque distribution rate applied to the clutch for the turning-external wheel is smallest when the drive mode of vehicle is the comfort mode, and is largest when the drive mode of vehicle is the drift mode.

9. The electric vehicle of claim 7, wherein when the drive mode of vehicle is the sports mode, the clutch torque distribution rate applied to the clutch for the turning-external wheel is determined as a value between the comfort mode and the drift mode.

10. A control method of an electric vehicle, the control method comprising:

determining, by a vehicle controller, whether a control condition for a deceleration turning of the vehicle is satisfied;

determining, by the vehicle controller, a control torque of a twin clutch as a larger value of an initial torque to prevent slip of the twin clutch and a base torque determined based on an output torque of a drive motor, when the control condition is satisfied; and distributing the control torque to a first clutch and a second clutch of the twin clutch depending on a drive mode of the vehicle in a clutch torque distribution rate.

11. The control method of claim 10, wherein the control condition includes element conditions of a vehicle speed being greater than or equal to a preset speed, a steering angle of a steering wheel being greater than or equal to a first preset angle, and an accelerator pedal opening being maintained to 0 for more than a preset time period.

12. The control method of claim 11, wherein the control condition is released when one element condition in the element conditions of the control condition is not satisfied.

13. The control method of claim 11, further including, when the steering angle of the steering wheel is above a second preset angle in the deceleration turning of the vehicle:

determining a yaw damping torque; and determining the control torque by adding the yaw damping torque to the larger value of the initial torque and the base torque.

14. The control method of claim 11, further including, when a first drive wheel corresponding to the first clutch or a second drive wheel corresponding to the second clutch slips in the deceleration turning of the vehicle:

determining a slip control torque; and determining the control torque by adding the slip control torque to the larger value of the initial torque and the base torque.

15. The control method of claim 10, wherein the drive mode includes a comfort mode, a sports mode, and a drift mode.

16. The control method of claim 15, wherein a clutch torque applied to a clutch of the first clutch and the second clutch for a turning-inner drive wheel among the first wheel and the second wheel is decreased and a clutch torque applied to a clutch of the first clutch and the second clutch for a turning-external drive wheel among the first drive wheel and the second drive wheel is increased as the drive mode is varied from the comfort mode to the sports mode, and from the sports mode to the drift mode.

17. The control method of claim 16, wherein the clutch torque distribution rate applied to the clutch for the turning-external wheel is smallest when the drive mode of vehicle is the comfort mode, and is largest when the drive mode of vehicle is the drift mode.

18. The control method of claim 16, wherein when the drive mode of vehicle is the sports mode, the clutch torque distribution rate applied to the clutch for the turning-external wheel is determined as a value between the comfort mode and the drift mode.

19. A non-transitory computer readable storage medium on which a program for performing the control method of claim 10 is recorded.

* * * * *